3,137,723
BORON CONTAINING HETEROCYCLIC COMPOUNDS AND PROCESS FOR PRODUCING THEM
Edward J. Pribyl, Metuchen, and Harry Louis Yale and Jack Bernstein, New Brunswick, N.J., assignors to Olin Mathieson Chemical Corporation, New York, N.Y., a corporation of Virginia
No Drawing. Filed Sept. 25, 1961, Ser. No. 140,257
13 Claims. (Cl. 260—55.1)

This invention relates to cyclic boron compounds. More particularly, the invention relates to compounds represented by the structural formula (I) 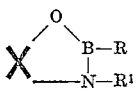

X represents the carbon-carbon linkage

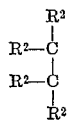

or carbon-nitrogen linkage

The symbol R represents hydroxy, alkyl, cycloalkyl, aryl and aralkyl groups. The aryl groups represented by R include the monocyclic phenyl group or bicyclic naphthayl group each of which may in addition bear one or more (preferably up to three) substituents such as lower alkyl e.g., methyl, ethyl, propyl, isopropyl, butyl and the like, a halogen, e.g. chlorine, bromine, iodine or fluorine, or a lower alkoxy group such as methoxy, ethoxy and the like. The aralkyl groups represented by R include the phenyl group, substituted or unsubstituted as described above, attached to a straight or branched chain lower alkylene chain. The alkyl groups represented by R are preferably lower alkyl groups such as those illustrated above and the cyclo alkyl groups include cycloaliphatic groups, preferably of 3 to 6 carbon atoms, such as cyclopropyl, cyclobutyl, cyclopenthyl and cyclohexyl.

$R^1$ represents hydrogen as well as lower alkyl and aralkyl groups of the charatcer defined above. It also represents basic groups such as di-lower alkylamino-lower alkenylene groups, e.g. dimethylaminomethyl, dimethylaminoethyl, diethylaminoethyl and the like; the nitrogen of the basic group may also be part of a 5- to 6- membered heterocyclic to form substituents such as piperidinomethyl, piperidinopropyl, morpholinomethyl, pyrrolidinomethyl and the like.

$R^2$ is representative of hydrogen, aryl, aryloxyalkylene, alkoxy, alkyl, haloalkyl and 5- to 6-membered heterocyclics. The aryl and alkyl groups are preferably of the character described previously in the discussion of the symbol R. The alkoxy groups are preferably lower alkoxy groups including similar lower alkyl radicals. The haloalkyl groups represented by $R^2$ include monohalogenated groups such as chloromethyl, bromoethyl and the like, as well as polyhalogenated groups such as trifluoromethyl. Any halogen may appear in this substituent. The aryloxy-lower alkylene substituents include, for example, phenoxymethyl, phenoxyethyl, tolyloxymethyl and the like. The heterocyclic groups include saturated and unsaturated nitrogen heterocyclics such as pyridine, piperidine, morpholine, pyrrolidine and the like.

Thus the invention includes compounds of the structure (II) 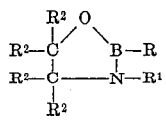

and (III) 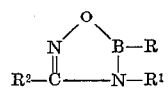

Preferably at least one $R^2$ on each carbon represents hydrogen and still more preferably, no more than one $R^2$ represents other than hydrogen in a single compound.

Compounds of this invention include, for example, 3,4-dimethyl-2,5-diphenyl-1,3,2-oxazaborolidine; 4-(p-chlorophenyl)-2,3-dihydro-2-(1-naphthyl)-1,3,5,2-oxadiazaboroline; 2,3-dihydro-2-(1-naphthyl)-4-phenyl-1,3,5,2 - oxadiazaboroline; 2,3-dihydro-2,4-diphenyl-1,3,5,2-oxadiazaboroline; 2,3-dihydro-2-(1-naphthyl)-4-(4-pyridyl)-1,3,5,2-oxadiazaboroline; 2,3-dihydro - 2 - phenyl-4-(4-pyridyl)-1,3,5,2-oxadiazaboroline; 2,3 - dihydro-2-(1-naphthyl)-4-(3-pyridyl)-1,3,5,2-oxadiazaboroline; 4-(p-chlorophenyl)-2,3-dihydro-2-hydroxy-1,3,5,2 - oxadiazaboroline; 2,3-dihydro-2-mesityl-4-(4-pyridyl) - 1,3,5,2 - oxadiazaboroline; 2,3-dihydro-2-(n-propyl)-4-(4-pyridyl)-1,3,5,2 - oxidiazaboroline; 2,3-dihydro-2-(2,4-dimethylphenyl)-1,3,5,2-oxadiazaboroline; 2,3-dihydro-2-(2,4-dimethylphenyl)-4-(4-pyridyl)-1,3,5,2-oxadiazaboroline; 2,3 - dihydro - 2 - (n-propyl)-4-(4-pyridyl)-1,3,5,2-oxadiazaboroline; 4-(p-anisyl)-2,3-dihydro-2-(2-naphthyl) - 1,3,5,2 - oxadiazaboroline; 2,3-dihydro-2-(2-naphthyl)-4-(m-tolyl)-1,3,5,2-oxadiazaboroline; 2-(p-anisyl)-2,3-dihydro-4-(p-sulfonamidophenyl)-1,3,5,2-oxadiazaboroline; 2,3 - dihydro-2-cyclohexyl-1,3,5,2-oxadiazaboroline.

The compounds of this invention are produced by the reaction between an amide oxime of the general formula

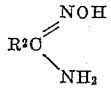

or an aminoalcohol of the general formula

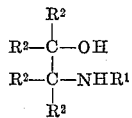

with a boronic acid of the general formula $RB(OH)_2$ in a hydrocarbon solvent like xylene, toluene or Skellysolve E (a petroleum ether with a B.P. range of 100–120°) or other non-hydroxylated solvent like dioxane, carbontetrachloride or diethyleneglycol dimethyl ether under conditions which lead to the removal of the water formed during the reaction, e.g., heating under reflux under conditions which do not allow the return of water to the reaction mixture.

The following examples are illustrative of the invention. Temperatures are given in degrees centigrade.

*Example 1*

A mixture of 13 g. of ephedrine, 9.5 g. of benzeneboronic acid and 300 ml. of anhydrous toluene is refluxed for four hours with a Dean-Stark trap provided for the separation of water. After standing overnight, the toluene is removed and the residual oil is covered with hexane. A small amount of insoluble solid is removed and the hexane distilled under atmospheric pressure. The residue is then distilled in vacuo to give 3,4-dimethyl-2,5-diphenyl- 1,3,2-oxazaborolidine as a greenish oil, B.P. 168–170°/1.5 mm.

Example 2

A mixture of 10.5 g. of 1-amino-3-(o-tolyloxy)-2-propanol, 7 g. of benzeneboronic acid, and 250 ml. of anhydrous toluene is refluxed for four hours with a Dean-Stark trap provided for the separation of water. After standing overnight, the toluene is removed. The residue becomes granular on triturating with hexane. This is dissolved in a boiling mixture of cyclohexane-benzene, cooled, the solid filtered and distilled to give 2-phenyl-5-(o-tolyloxymethyl)-1,3,2-oxazaborolidine, M.P. 75–77°.

Example 3

(a) To 17.5 g. of hydroxylamine hydrochloride, 34.5 g. of p-chlorobenzonitrile, 90 ml. of water and 125 ml. of 95% ethanol are added slowly 13.5 g. of anhydrous sodium carbonate. The mixture is stirred for 24 hours at room temperature, concentrated from the steam bath and the residue extracted with ether. The ether extracts are dried and concentrated. The residual solid is recrystallized to give p-chlorobenzamide oxime, M.P. 127–130°.

(b) A mixture of 1.72 g. of the above compound, 1.72 g. of 1-naphthaleneboronic acid and 50 ml. of dry xylene is heated under a Dean-Stark water separator. Reaction is complete in about three hours. The solid which separates from the cooled reaction is filtered to give 4-(p-chlorophenyl)-2,3-dihydro-2-(1-naphthyl)-1,3,5,2-oxadiazaboroline, M.P. 148–150°.

Example 4

A mixture of 1.36 of recrystallized benzamide oxime, 1.72 of 1-naphthaleneboronic acid and 50 ml. of dry xylene is heated under reflux for three hours under a Dean-Stark trap. The cooled reaction mixture yields 2,3-dihydro-2-(1-napthyl)-4-phenyl-1,3,5,2-oxadiazaboroline which is recrystallized from Skellysolve E, M.P. 146–147°.

Example 5

A solution of 1.36 g. benzamide oxime and 1.22 g. of benzeneboronic acid in 150 ml. of dry toluene are refluxed under a Dean-Stark trap. Reaction is complete in one hour to give 2,3-dihydro-2,4-diphenyl-1,3,5,2-oxadiazaboroline, M.P. 159–160°.

Example 6

1.36 g. of isonicotinamide oxime and 1.72 g. of 1-naphthaleneboronic acid in 100 ml. of dry xylene, are reacted as described in Example 3(b). The reaction is complete in less than two hours. The product crystallizes on cooling the reaction mixture to give the product 2,3-dihydro-2-(1-naphthyl)-4-(4-pyridyl)-1,3,5,2-oxadiazaboroline which is recrystallized from dry toluene, M.P. 200–202°.

Example 7

To 20.8 g. of isonicotinonitrile, 14 g. of hydroxylamine hydrochloride, 70 ml. of water and 100 ml. of 95% ethanol are added slowly 10.8 g. of anhydrous sodium carbonate. The mixture is stirred overnight at room temperature, heated on the steam bath to distil the ethanol, the residual liquid is saturated with salt and extracted with ethyl acetate. The crude amide oxime is isolated from the ethyl acetate, and recrystallized from ethyl acetate. The ethyl acetate recrystallized amidoxime, M.P. 172–174°, 1.36 g., and 1.22 g. of benzeneboronic acid are reacted in 100 ml. of dry xylene as described in Example 3. The crude product 2,3-dihydro-2-phenyl-4-(4-pyridyl)-1,3,5,2-oxadiazaboroline which crystallizes from the reaction mixture is recrystallized from dry toluene, M.P. 211–213°.

Example 8

To 20.8 g. of nicotinonitrile, 14 g. of hydroxylamine, 70 ml. of water and 100 cc. 95% ethanol are added portionwise, with stirring, 10.8 g. of anhydrous sodium carbonate. The mixture is stirred overnight, concentrated from the steam bath to a small volume and cooled. The solid which separates is filtered, dried and recrystallized from chlorobenzene. The nicotinamide oxime thus produced, 1.36 g., 1.72 g. 1-napthaleneboronic acid and 100 ml. of dry xylene are reacted as described in Example 3(b). The product, 2,3-dihydro-2-(1-naphthyl)-4-(3-pyridyl)-1,3,5,2-oxadiazaboroline which crystallizes from the reaction mixture is recrystallized from dry toluene, M.P. 198–200°.

Example 9

A mixture of 1.7 g. of p-chlorobenzamide oxime, 2.3 g. of trimethylborate and 125 ml. of dry toluene are distilled for four hours. The solid which separates from the hot solution is filtered, washed with ether and dried to give 0.58 g. of 4-(p-chlorophenyl)-2,3-dihydro-2-hydroxy-1,3,5,2-oxadiazaboroline sinters at 280°, turns black at 320°, but does not melt.

Example 10

A mixture of 1.37 g. of isonicotinamide oxime, 1.64 g. of mesityleneboronic acid and 150 ml. of dry xylene are reacted as in Example 3 to give 2,3-dihydro-2-mesityl-4-(4-pyridyl)-1,3,5,2-oxadiazaboroline, M.P. 159–160°.

Example 11

By substituting 1.50 g. of 2,4-dimethylbenzeneboronic acid for the mesityleneboronic acid in Example 10, there is obtained 2,3-dihydro-2-(2,4-dimethylphenyl)-4-pyridyl)-1,3,5,2-oxadiazaboroline.

Example 12

By susbtituting 0.88 g. of n-propaneboronic acid for the mesityleneboronic acid in Example 10, there is obtained 2,3-dihydro-2-(n-propyl)-4-(4-pyridyl)-1,3,5,2-oxadiazaboroline.

Example 13

(a) By substituting 43.0 g. of p-anisonitrile for the p-chlorobenzonitrile in Example 3(a), there is obtained p-anisamide oxime.

(b) A mixture of 1.65 g. of the compound from (a), 1.72 g. of 2-naphthaleneboronic acid and 50 ml. of dry toluene are reacted as in Example 3(b) to give 4-(p-anisyl)-2,3-dihydro-2-(2-naphthyl)-1,3,5,2-oxadiazaboroline.

Example 14

By substituting 1.49 g. of m-toluamide oxime for the p-anisamide oxime in Example 13(b), there is obtained 2,3-dihydro-2-(2-naphthyl)-4-(m-tolyl)-1,3,5,2-oxadiazaboroline.

Example 15

(a) By substituting 45.5 g. of p-cyanobenzenesulfonamide (prepared from p-sulfobenzoic acid via treatment with thionyl chloride in the presence of N,N-dimethylformamide, followed by reaction with ammonia to give p-sulfonamidobenzamide, and dehydration of the latter) for the p-chlorobenzonitrile in Example 3(a), there is obtained p-sulfonamidobenzamide oxime.

(b) By replacing the p-chlorobenzamide oxime in Example 3(b) with 2.15 g. of the product from (a) and 1.52 g. of p-anisoleboronic acid for the 1-naphthaleneboronic acid in Example 3(b), there is obtained 2-(p-anisyl)-2,3-dihydro-4-(p-sulfonamidophenyl)-1,3,5,2-oxadiazaboroline.

The compound of this invention have central depressant activity and are useful in psychotherapy. They also are cardioactive and are useful as hypotensive agents. They may be administered orally or parenterally in conventional vehicles according to accepted practice.

What is claimed is:

1. A compound of the formula

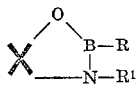

wherein X is a member of the group consisting of the carbon-carbon linkage

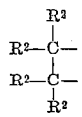

and the carbon-nitrogen linkage

R is a member of the group consisting of hydroxy, lower alkyl, cycloalkyl of 3 to 6 carbon atoms, monocyclic aryl and bicyclic aryl bearing 0 to 3 members of the group consisting of lower alkyl, lower alkoxy and halogen and phenyl-lower alkylene bearing on the phenyl ring 0 to 3 members of the group consisting of lower alkyl, lower alkoxy and halogen; $R^1$ is a member of the group consisting of hydrogen, lower alkyl, phenyl-lower alkylene bearing on the phenyl ring 0 to 3 members of the group consisting of lower alkyl, lower alkoxy and halogen, di-lower alkylamino-lower alkylene, piperidino-lower alkylene, morpholino-lower alkylene and pyrrolidino-lower alkylene; and $R^2$ is a member of the group consisting of hydrogen, lower alkyl, lower alkoxy, phenoxy-lower alkylene bearing on the phenyl ring 0 to 3 members of the group consisting of lower alkyl, lower alkoxy and halogen, halo-lower alkyl, pyridyl, piperidino, morpholino and pyrrolidino.

2. A compound of the formula

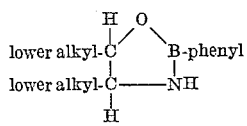

3. A compound of the formula

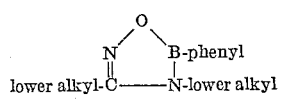

4. A compound of the formula

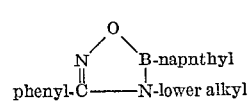

5. A compound of the formula

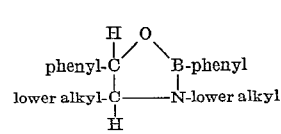

6. 3,4-dimethyl-2,5-diphenyl-1,3,2-oxazaborolidine.
7. 2-phenyl - 5 - (o-tolyloxymethyl)-1,3,2-oxazaborolidine.
8. 4-(p-chlorophenyl) - 2,3 - dihydro-2-(1-naphthyl)-1,3,5,2-oxadiazaboroline.

9. A process for the production of a compound of the formula

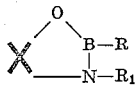

wherein X is a member of the group consisting of the carbon-carbon linkage

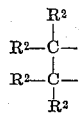

and the carbon-nitrogen linkage

R is a member of the group consisting of hydroxy, lower alkyl, cycloalkyl of 3 to 6 carbon atoms, monocyclic aryl and bicyclic aryl bearing 0 to 3 members of the group consisting of lower alkyl, lower alkoxy and halogen, and phenyl-lower alkylene bearing on the phenyl ring 0 to 3 members of the group consisting of lower alkyl, lower alkoxy and halogen; $R^1$ is a member of the group consisting of hydrogen, lower alkyl, phenyl-lower alkylene bearing on the phenyl ring 0 to 3 members of the group consisting of lower alkyl, lower alkoxy and halogen, di-lower alkylamino-lower alkylene, piperidino-lower alkylene, morpholino-lower alkylene and pyrrolidino-lower alkylene, and $R^2$ is a member of the group consisting of hydrogen, lower alkyl, lower alkoxy, phenoxy, lower alkylene bearing on the phenyl ring 0 to 3 members of the group consisting of lower alkyl, lower alkoxy and halogen, halo-lower alkyl, pyridyl, piperidino, morpholino and pyrrolidino, which comprises reacting a member of the group consisting of

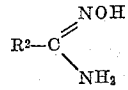

and

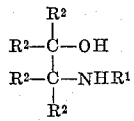

wherein $R^1$ and $R^2$ have the same meaning as above, with a boronic acid of the formula $$R-B(OH)_2$$

wherein R has the same meaning as above, in a non-aqueous medium.

10. 2,3-dihydro-2-(1-naphthyl) - 4 - phenyl-1,3,5,2-oxadiazoboroline.
11. 2,3-dihydro - 2 - phenyl-4-(4-pyridyl)-1,3,5,2-oxadiazaboroline.
12. 2,3-dihydro-2,4-diphenyl-1,3,5,2-oxadiazaboroline.
13. 4-(p-chlorophenyl)-2,3-dihydro - 2 - hydroxy-1,3,5,2-oxadiazaboroline.

References Cited in the file of this patent

Solloway: J. American Chem. Soc., vol. 82, No. 10, pages 2442–44 (1960).